US010850776B2

(12) United States Patent
Birnkammer et al.

(10) Patent No.: US 10,850,776 B2
(45) Date of Patent: Dec. 1, 2020

(54) MOTOR VEHICLE

(71) Applicant: Bayerische Motoren Werke Aktiengesellschaft, Munich (DE)

(72) Inventors: Maria Birnkammer, Munich (DE); Peter Hirsch, Freising (DE); Clemens Walther, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 81 days.

(21) Appl. No.: 16/268,843

(22) Filed: Feb. 6, 2019

(65) Prior Publication Data
US 2019/0168821 A1    Jun. 6, 2019

Related U.S. Application Data

(63) Continuation of application No. PCT/EP2017/067800, filed on Jul. 14, 2017.

(30) Foreign Application Priority Data

Aug. 11, 2016 (DE) .......... 10 2016 214 996

(51) Int. Cl.
*B62D 25/20* (2006.01)
*B62D 29/00* (2006.01)
(Continued)

(52) U.S. Cl.
CPC ......... *B62D 25/2027* (2013.01); *B62D 21/02* (2013.01); *B62D 25/2018* (2013.01);
(Continued)

(58) Field of Classification Search
CPC ............ B62D 25/2027; B62D 25/2018; B62D 29/004; B62D 21/02; B62D 27/065; B62D 29/005
(Continued)

(56) References Cited

U.S. PATENT DOCUMENTS 6,503,585 B1    1/2003  Wagenblast et al.
7,905,541 B2 *  3/2011  Yamaguchi ........ B62D 25/2027
                                                296/203.04
(Continued)

FOREIGN PATENT DOCUMENTS

CN        102019961 B     3/2014
DE        198 48 516 A1   4/2000
(Continued)

OTHER PUBLICATIONS

International Search Report (PCT/ISA/210) issued in PCT Application No. PCT/EP2017/067800 dated Oct. 18, 2017 with English translation (eight (8) pages).
(Continued)

*Primary Examiner* — Jason S Morrow
*Assistant Examiner* — E Turner Hicks
(74) *Attorney, Agent, or Firm* — Crowell & Moring LLP

(57) ABSTRACT

A motor vehicle has a self-supporting body which has a passenger compartment, with two longitudinal members, with two rear reinforcing struts which run in a V-shaped manner and are fastened at the front ends thereof to lateral longitudinal member portions of the two longitudinal members. The lateral longitudinal portions run below the passenger compartment. The two reinforcing struts are arranged at the rear ends thereof on a receiving component. The receiving component is a plastics/metal hybrid component which is composed of an open, shell-shaped metal component and of a fiber-reinforced reinforcing plastics component. The plastics component is integrated in the metal component and reinforces the metal component.

6 Claims, 5 Drawing Sheets

(51) Int. Cl.
*B62D 21/02* (2006.01)
*B62D 27/06* (2006.01)

(52) U.S. Cl.
CPC ......... *B62D 27/065* (2013.01); *B62D 29/004* (2013.01); *B62D 29/005* (2013.01)

(58) Field of Classification Search
USPC ............................................ 296/204, 29, 30
See application file for complete search history.

(56) References Cited

U.S. PATENT DOCUMENTS

| | | | |
|---|---|---|---|
| 9,592,856 B2* | 3/2017 | Nakamura | B62D 25/06 |
| 9,604,672 B2* | 3/2017 | Kaneko | B62D 25/2027 |
| 2005/0110303 A1* | 5/2005 | Neumeier | B62D 23/00 |
| | | | 296/204 |
| 2008/0231085 A1 | 9/2008 | Westing et al. | |
| 2013/0249249 A1* | 9/2013 | Andree | B62D 29/001 |
| | | | 296/204 |
| 2017/0073019 A1* | 3/2017 | Kabayama | B62D 21/155 |
| 2019/0168821 A1* | 6/2019 | Birnkammer | B62D 21/02 |
| 2020/0114975 A1* | 4/2020 | Ogawa | B60J 7/20 |

FOREIGN PATENT DOCUMENTS

| | | |
|---|---|---|
| DE | 102 14 372 C1 | 7/2003 |
| DE | 10 2004 044 476 A1 | 4/2006 |
| DE | 10 2010 053 346 A1 | 6/2012 |
| DE | 10 2011 011 059 A1 | 8/2012 |
| DE | 10 2012 013 900 A1 | 1/2014 |
| DE | 10 2014 207 555 A1 | 10/2015 |
| JP | 2008-221968 A | 9/2008 |
| WO | WO 2005/102824 A1 | 11/2005 |

OTHER PUBLICATIONS

German-language Written Opinion (PCT/ISA/237) issued in PCT Application No. PCT/EP2017/067800 dated Oct. 18, 2017 (eight (8) pages).

German-language Search Report issued in counterpart German Application No. 10 2016 214 996.2 dated Mar. 30, 2017 with partial English translation (19 pages).

* cited by examiner

MOTOR VEHICLE

CROSS REFERENCE TO RELATED APPLICATIONS

This application is a continuation of PCT International Application No. PCT/EP2017/067800, filed Jul. 14, 2017, which claims priority under 35 U.S.C. § 119 from German Patent Application No. 10 2016 214 996.2, filed Aug. 11, 2016, the entire disclosures of which are herein expressly incorporated by reference.

BACKGROUND AND SUMMARY OF THE INVENTION

The invention relates to a motor vehicle having a self-supporting vehicle body which has a passenger compartment, with two longitudinal carriers which run on a floor of the vehicle body and which extend from a vehicle front section over the floor of the passenger compartment as far as into a vehicle rear.

DE 10214372 A discloses a motor vehicle with a self-supporting vehicle body. Two rear-side reinforcing struts which are arranged in a V-shaped manner are provided on the underside of the floor in order to reinforce the vehicle body. The two reinforcing struts converge in each case in the direction of a vehicle rear. As a result of the V-shaped arrangement of the reinforcing struts on the vehicle body undertray, the torsional amplitudes of the vehicle body are reduced on account of the increased torsional rigidity of the vehicle body. The two rear-side ends of the reinforcing struts are fastened to a receiving component. The two front ends of the reinforcing struts which lie opposite said rear-side ends are fastened to two lateral longitudinal carriers below a passenger compartment.

It is an object of the invention to provide a motor vehicle, in which the construction of the receiving component for the fastening of the two ends of the rear-side reinforcing struts is simplified.

In the case of a motor vehicle according to the invention with a self-supporting vehicle body which has a passenger compartment, two longitudinal carriers run on a floor of the vehicle body. The two longitudinal carriers extend from a vehicle front section over the floor of the passenger compartment as far as into a vehicle rear. Furthermore, two rear reinforcing struts which run in a V-shaped manner are provided which are fastened with their front ends to lateral longitudinal carrier sections of the two longitudinal carriers, which lateral longitudinal carrier sections run below the passenger compartment. The rear ends of the two reinforcing struts are arranged on a receiving component.

The receiving component is advantageously a plastic/metal hybrid component which consists of an open, shell-shaped metal component and of a fiber reinforced plastic component. The fiber reinforced plastic reinforcing component is integrated into the metal component and reinforces the metal component.

The receiving component according to the invention is in one piece, is optimized in terms of weight and is highly rigid in the finished state.

In one advantageous embodiment, the reinforcing component has two arms which run in a V-shaped manner and are connected in one piece to one another at a node or connecting section of the reinforcing component.

The reinforcing component advantageously has a shell-shaped upper part, the outer face of which corresponds to an inner face of the metal component.

In one advantageous embodiment, reinforcing webs with annular fastening sections are configured in one piece on an underside of the reinforcing component of the receiving component.

The annular fastening sections of the reinforcing component are advantageously connected via connecting webs to a circumferential outer edge of the shell of the reinforcing component.

In one advantageous embodiment, through openings for the through openings for the fastening sections and the through openings on the connecting section are configured in the annular fastening sections of the reinforcing component.

A thread for a screw connection is advantageously integrated into the respective opening of the plastic reinforcing component for fastening the respective end of the reinforcing strut.

The connecting section of the receiving component is advantageously spaced apart in the vertical direction by a predefined height from the respective flange-shaped fastening section at the respective arm.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
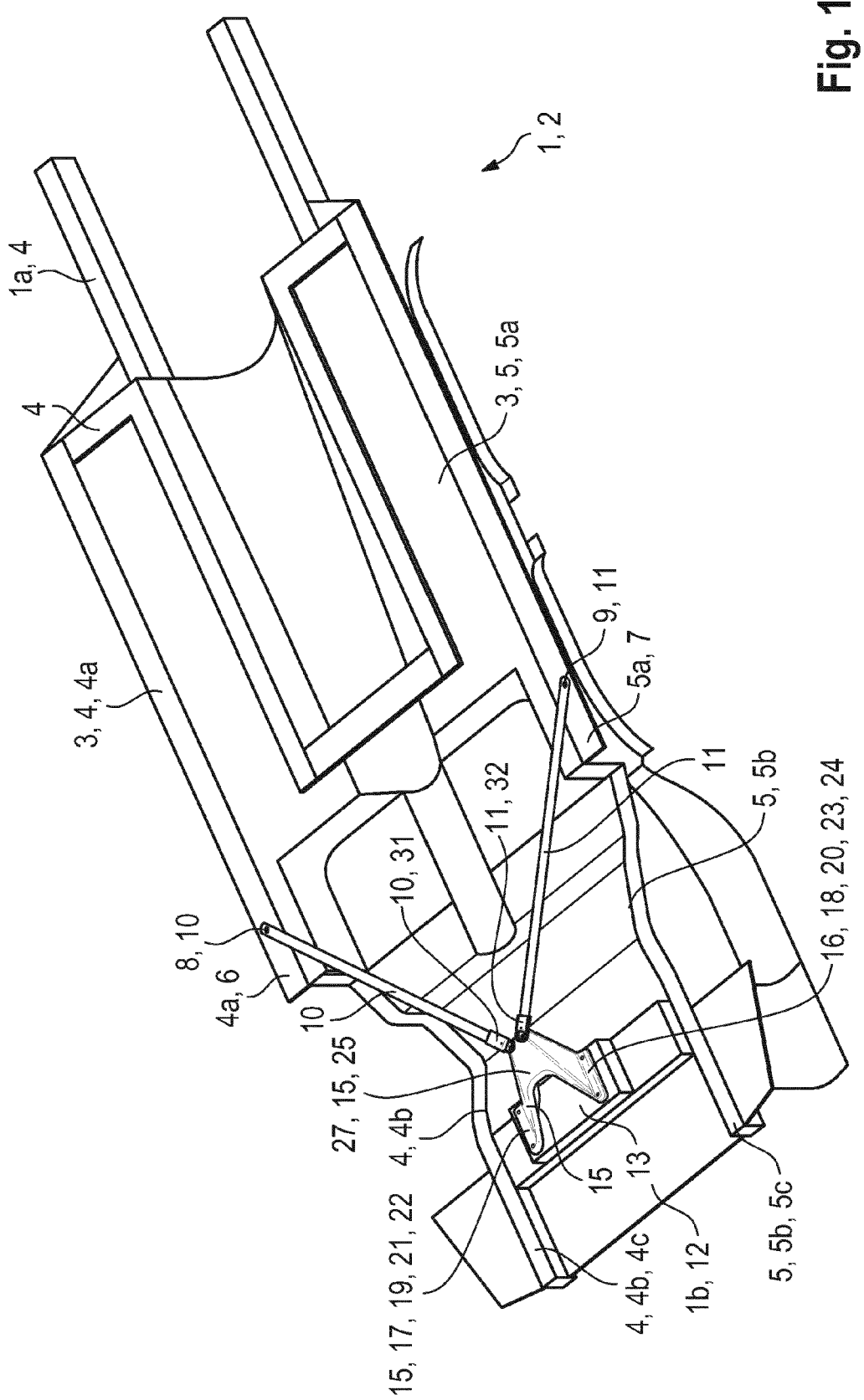
FIG. 1 is a perspective view from below of a floor of a motor vehicle.

FIG. 1 shows a perspective view of a floor 3 of a self-supporting vehicle body 2 of a motor vehicle 1, which vehicle body 2 has a passenger compartment. Two longitudinal carriers 4, 5 run on the floor 3 of the vehicle body 2 below a passenger compartment (not shown).

The two longitudinal carriers 4, 5 extend from a vehicle front section 1a over the floor 3 of the passenger compartment as far as into a vehicle rear 1b and a rear-side end 12 of the floor 3. The two longitudinal carriers 4, 5 have two outer, sill-side longitudinal carrier sections 4a and 5a which run parallel to one another and are adjoined by two rear, rear-side longitudinal carrier sections 4b and 5b.

In each case one front end 8, 9 of a reinforcing strut 10, 11 is fastened to a rear end 6, 7 of the respective longitudinal carrier section 4a and 5a. The two reinforcing struts 10, 11 extend in a V-shaped manner to a receiving component 14.

The receiving component 14 is fastened to a tub-shaped component 13 on the floor 3 of the vehicle rear 1b of the motor vehicle 1. The receiving component 14 is V-shaped in plan view.

The receiving component 14 is a plastic/metal hybrid component which is constructed from a metal component 36 and a plastic reinforcing component 35. The plastic reinforcing component 35 is integrated into the metal component 36. In each case one rear end 31, 32 of the reinforcing strut 10, 11 is fastened to the receiving component 14.

The receiving component 14 has two lateral arms 15, 16 which have in each case one flange-shaped fastening section 19, 20 at their free ends 17, 18. In the embodiment which is shown, the respective fastening section 19, 20 is of approximately rectangular configuration and has in each case two through openings 21, 22 and 23, 24.

Those ends 25, 26 of the arms 15, 16 of the receiving component 14 which are spaced apart from the floor 3 of the vehicle body 2 are connected to one another in one piece at a node or connecting section 27 of the receiving component 14. In the embodiment which is shown, two through openings 29, 30 for fastening rear ends 31, 32 of the reinforcing struts 10, 11 are configured on a front section 28 of the connecting section 27 of the receiving component 14.

The designations for the components of the receiving component 14, such as the arms 15, 16, the free ends 17, 18 of the arms 15, 16, the fastening sections 19, 20 at the free ends 17, 18 of the arms 15, 16 and the ends 25, 26 of the arms 15, 16 at the connecting section 27 for example, apply both to the plastic reinforcing component 35 and to the metal component 36.

For the sake of clarity, there are corresponding subscripts to the corresponding components in the text and in the figures merely occasionally. For example, the connecting section 27 on the plastic reinforcing component 35 is denoted occasionally by $27_{35}$ and the connecting section 27 on the metal component 36 is denoted occasionally by $27_{36}$.

In each case one rear longitudinal carrier section 4b and 5b adjoins the respective rear end 6, 7 of the sill-side longitudinal carrier section 4a and 5a, which rear longitudinal carrier section 4b and 5b extends in each case to a rear-side end 1a. In the embodiment which is shown, the rear-side ends 4c and 5c of the rear longitudinal carrier section 4b and 5b have a rectangular cross section.

Figure 2:
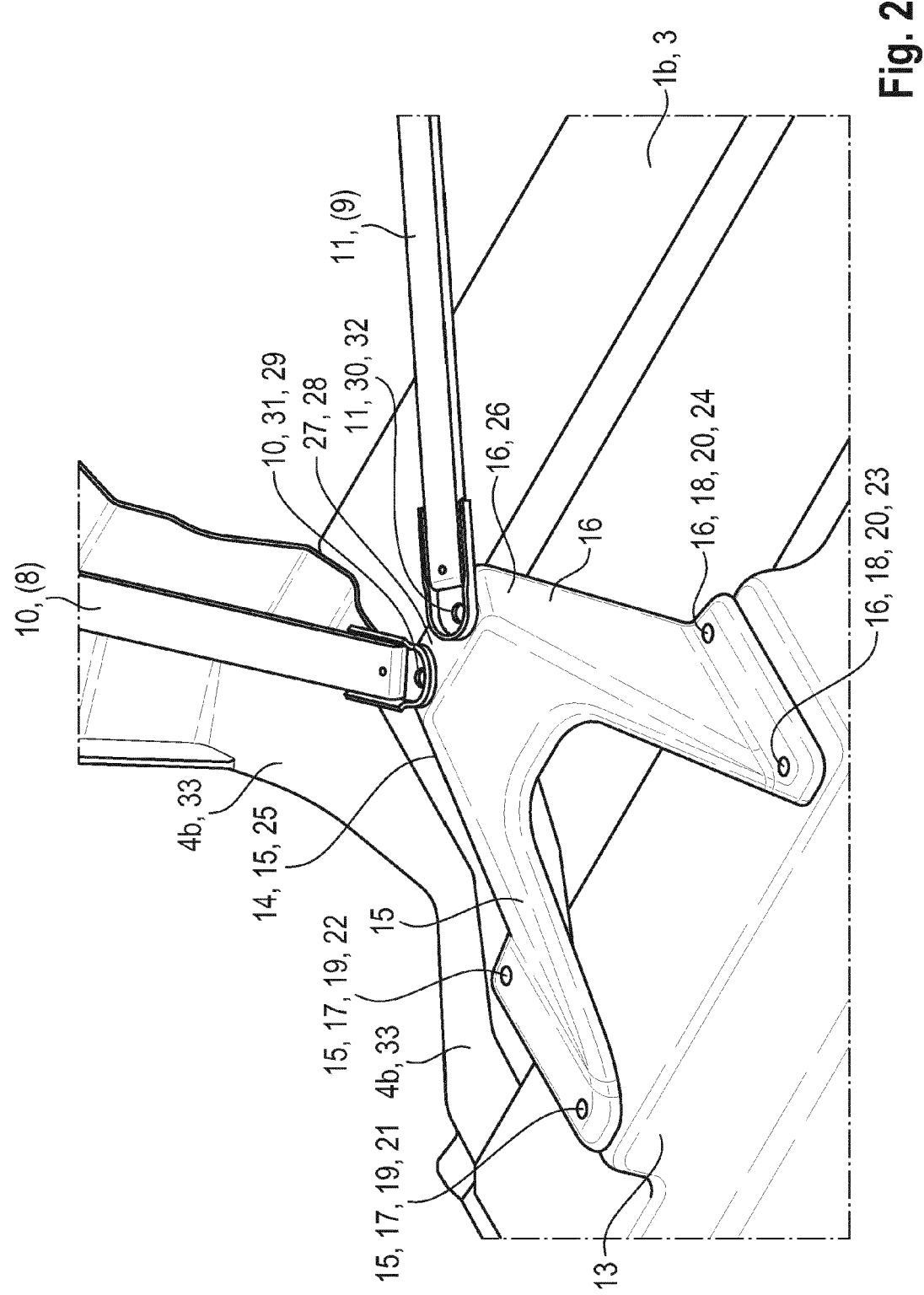
FIG. 2 is an enlarged illustration of a receiving component which is shown in FIG. 1.

A region of the rear longitudinal carrier section 4b which runs in the region of a wheel arch 33 is apparent from the enlarged illustration in FIG. 2. Furthermore, the tub-shaped component 13 can be seen partially in FIG. 2. In the embodiment which is shown, at least one battery (not shown) is arranged in the tub-shaped component 13.

The flange-shaped fastening sections 19, 20 of the two arms 15, 16 and the through openings 21, 22 and 23, 24 which are configured in the fastening sections 19, 20 can be seen in FIG. 2. The respective rear end 31, 32 of the respective reinforcing strut 10, 11 is fastened via the through openings 29, 30, for example via a screw connection.

Figure 3:
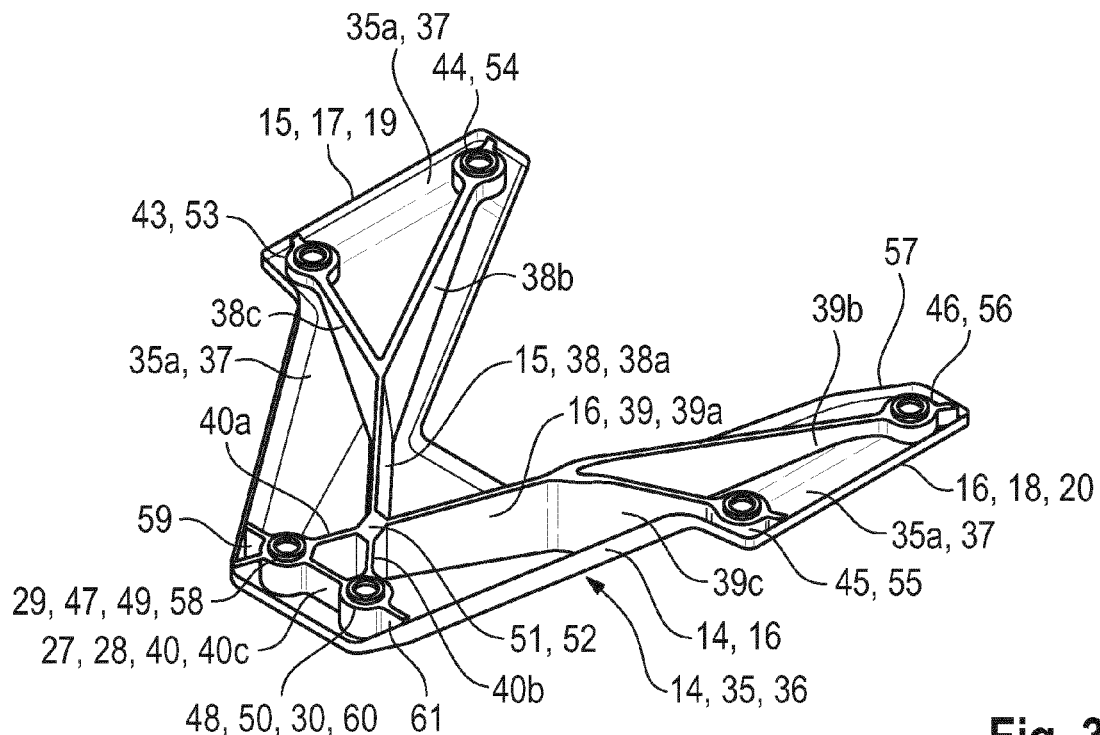
FIG. 3 is a perspective view of an underside of a reinforcing component of the receiving component.
Figure 4:
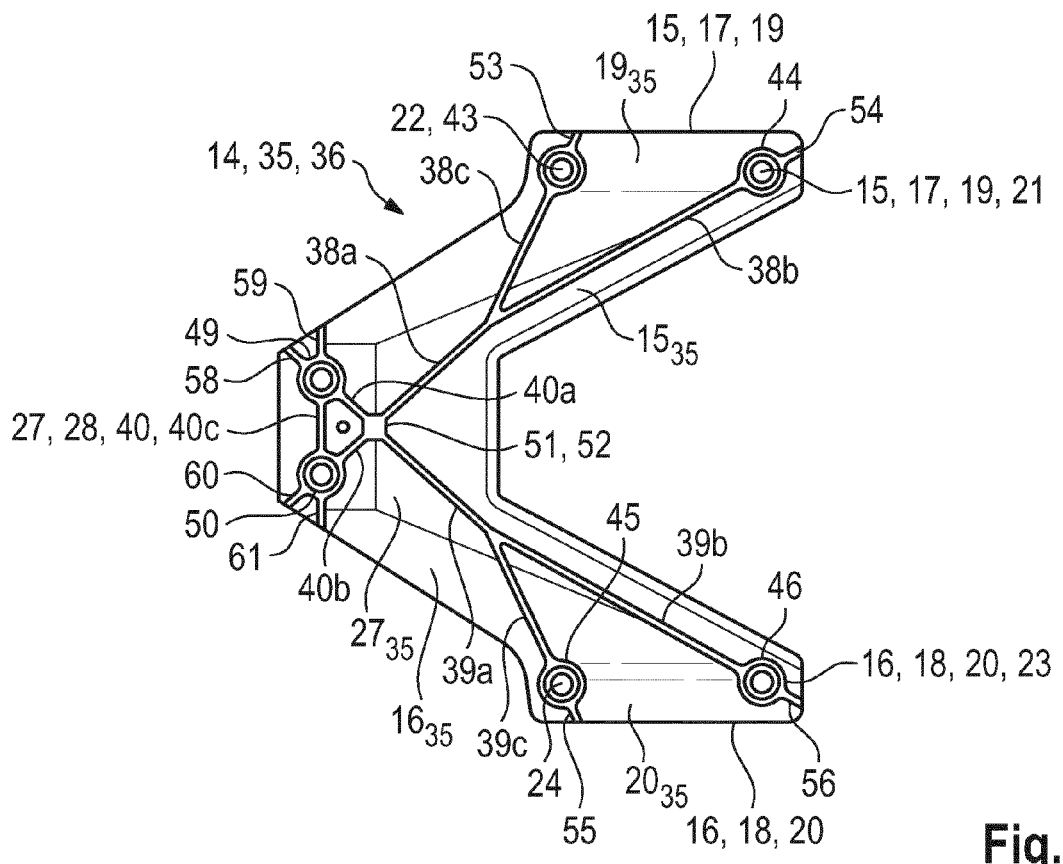
FIG. 4 is a view from above of the underside (shown in FIG. 3) of the reinforcing component of the receiving component.

FIG. 3 shows a perspective view of an underside 34 of the receiving component 14. The underside 34 of the receiving component 14 is a plastic reinforcing component 35 which is produced from a fiber reinforced plastic in the embodiment which is shown.

The plastic is, for example, a thermoplastic or thermoset. The fibers which are used are, for example, short, long, and/or endless fibers. The fibers are, for example, carbon fibers or glass fibers. The length of the fibers which are used is adapted in accordance with the requirements. The fiber which is used can be arranged loosely and/or can be connected to one another in the form of a woven textile fabric and/or can be oriented in accordance with the load direction.

The open, shell-shaped metal component 36 has an inherent rigidity and is additionally reinforced by way of the integrated plastic reinforcing component 35. The metal component 36 can be produced, for example, from steel or a light metal. In the embodiment which is shown, the open metal component 36 covers the plastic reinforcing component 35 completely.

The use of an open, shell-shaped metal component 36 results in a smooth and high strength metal surface, to which the metallic ends of the reinforcing struts 10, 11 can be fastened simply, for example by way of a screw (threaded) connection.

The fastening between the smooth and high strength metal surface of the flange-shaped fastening sections 19, 20 of the metal component 36 and the metallic, tub-shaped component 13 of the floor 3 of the vehicle body 2 is also permanent and simple, for example by way of a screw (threaded) connection.

Figure 6:
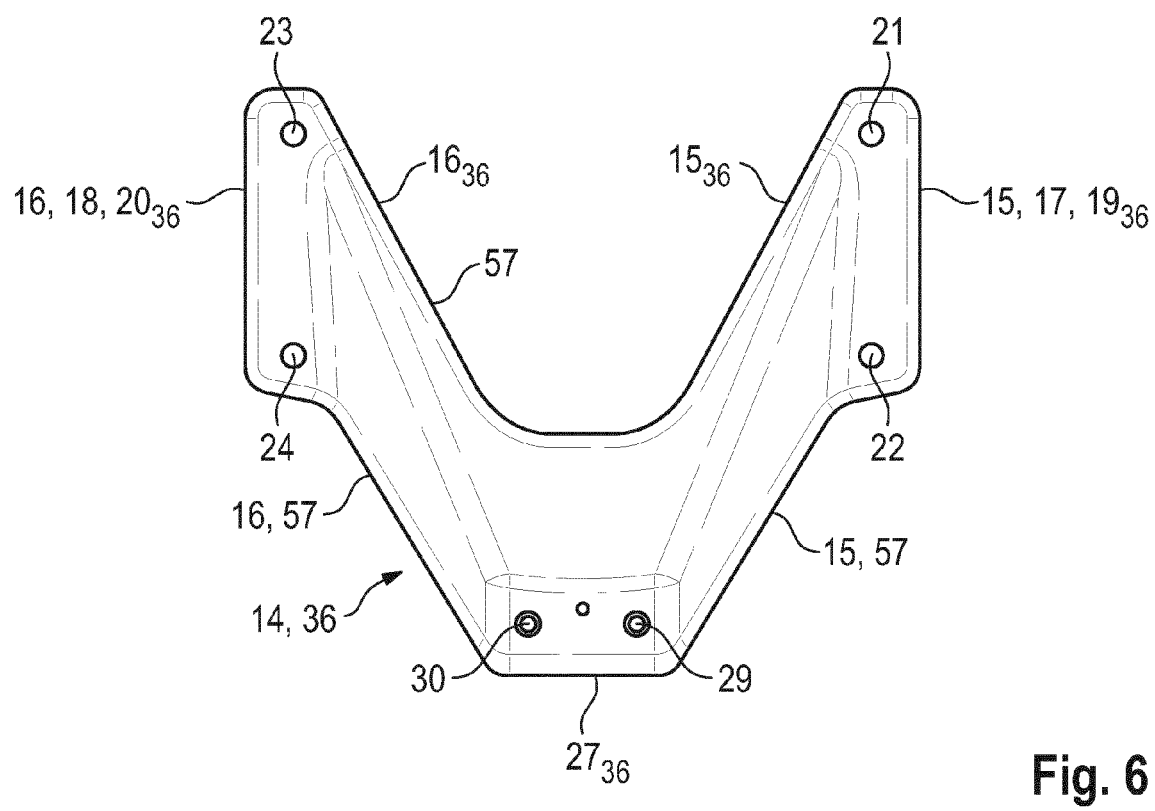
FIG. 6 is a view from above of a shell-shaped metal component, into which the reinforcing component of the receiving component is integrated.

The plastic reinforcing component 35 is covered by the open metal component 36 which is shown in FIG. 6. The plastic reinforcing component 35 has a smooth outer face 63 (not shown) which points toward a smooth inner face 64 (not shown) of the metal component 36. Reinforcing webs 38, 39 and 40 are configured in one piece on an inner face 37 of the plastic reinforcing component 35, which inner face 37 faces away from the metal component 36. The reinforcing webs 38, 39 run in each case in one of the two arms 15, 16. The reinforcing webs 40 are arranged in the region of the connecting section 27.

In the embodiment which is shown in FIG. 3, Y-shaped reinforcing webs 38a, 38b, 38c and 39a, 39b, 39c are configured in each case. Annular fastening sections 43, 44 and 45, 46 for the through openings 23, 24 and 21, 22 are configured at the respective free ends 41, 42 of the reinforcing webs 38b and 38c and at the free ends 43, 44 of the reinforcing webs 39b and 39c.

In the embodiment which is shown, the reinforcing webs 40a, 40b and 40c are arranged in a triangular manner. Two annular fastening sections 49, 50 for the through openings 29, 30 are configured on two opposite corners 47, 48 at the level of the front section 28. The corresponding ends of the connecting webs 38a and 39a are connected to one another at a further corner 51 with the formation of a node 52.

The annular fastening sections 43, 44 and 45, 46 are connected via connecting webs to a circumferential outer edge 57 of a shell 35a (which can be seen in the sectional view of FIG. 7) of the plastic reinforcing component 35. In the same way, in each case two connecting webs 58, 59 and 60, 61 are connected to the circumferential outer edge 57 of the plastic reinforcing component 35. The annular fastening sections 43, 44; 45, 46; 49, 50 are connected via connecting webs 53, 54; 55, 56; 58, 59 to a circumferential outer edge 57 of the shell 35a of the plastic reinforcing component 35.

Figure 5:
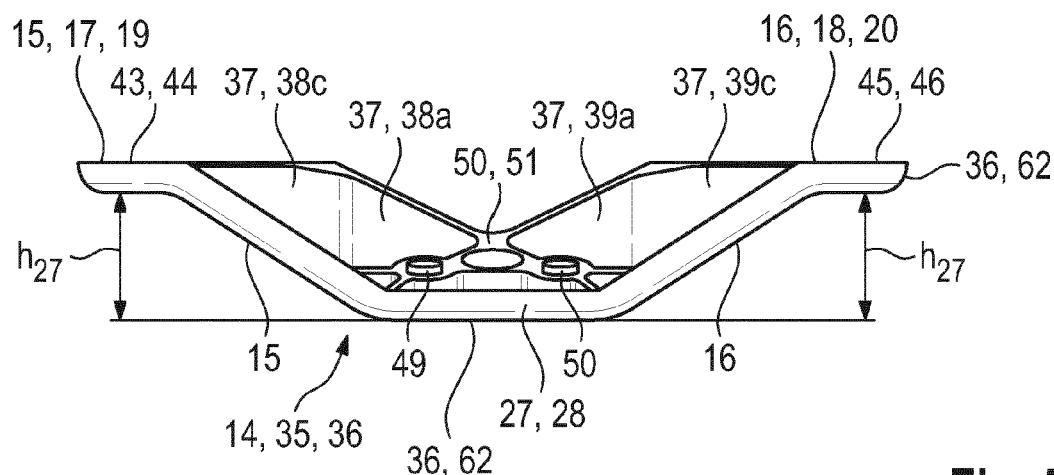
FIG. 5 is a view from the side of the receiving component which is shown in FIGS. 3 and 4.

It is apparent from the side view of FIG. 5 that there is a vertical spacing $h_{27}$ between an outer face 62 of the metal component 36 in the region of the fastening sections 19, 20 and the connecting section 27. The vertical spacing $h_{27}$ is dependent on the height of the lateral longitudinal carrier sections 4a, 5a and the height of the floor 3 in the region 13 of the attachment of the receiving component 14. The height $h_{27}$ lies, for example, in a range of 5 cm $\leq h_{27} \leq$ 20 cm.

The two fastening sections 19, 20 on the arms 15, 16 with the through openings 21, 22 and 23, 24 which are configured therein are apparent from the view from above of FIG. 6 of the outer face 62 of the metal component 36 and the receiving component 14.

Figure 7:
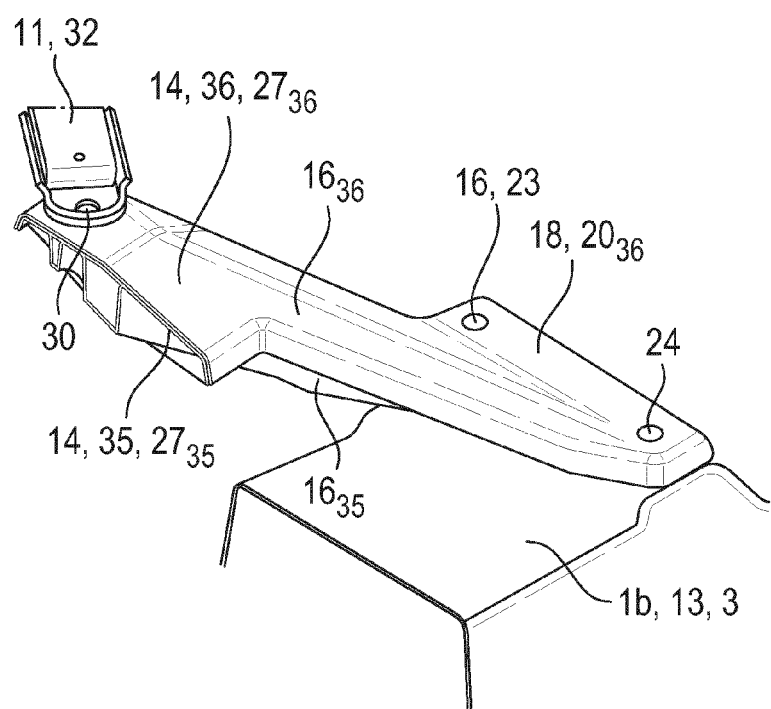
FIG. 7 is a perspective view of a sectional illustration of the receiving component, from which perspective view the arrangement of one end of a reinforcing strut and the fastening of the receiving component to the floor of the motor vehicle body are apparent.

It is apparent from the sectional illustration of FIG. 7 that the shape of an outer face 63 of the plastic reinforcing component 35 corresponds to an inner face 64 of the metal component 36.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with a self-supporting vehicle body which has a passenger compartment, comprising:
    two longitudinal carriers which run on a floor of the vehicle body and which extend from a vehicle front section over the floor of the passenger compartment into a vehicle rear;
    two rear reinforcing struts which run in a V-shaped manner and are fastened at respective front ends to respective lateral longitudinal carrier sections of the two longitudinal carriers, said respective lateral longitudinal carrier sections running below the passenger compartment;
    a receiving component on which respective rear ends of the two reinforcing struts are arranged, wherein
    the receiving component is a plastic and metal hybrid component comprising an open, shell-shaped metal component and a fiber reinforced plastic reinforcing component,
    the fiber reinforced plastic reinforcing component is integrated into the metal component and reinforces the metal component,
    the fiber reinforced plastic reinforcing component has two arms which run in a V-shaped manner and are connected to one another in one piece on a connecting section of the plastic reinforcing component, and
    reinforcing webs with annular fastening sections are configured in one piece on an underside of the fiber reinforced plastic reinforcing component of the receiving component.

2. The motor vehicle as claimed in claim 1, wherein the plastic reinforcing component has a shell-shaped upper part, an outer face of which corresponds to an inner face of the shell-shaped metal component.

3. The motor vehicle as claimed in claim 1, wherein the annular fastening sections are connected via connecting webs to a circumferential outer edge of the shell-shaped upper part of the plastic reinforcing component.

4. The motor vehicle as claimed in claim 3, wherein through openings are configured in the annular fastening sections of the plastic reinforcing component.

5. The motor vehicle as claimed in claim 4, wherein a thread for a screw connection is integrated into the respective through openings of the plastic reinforcing component for fastening the respective end of the reinforcing strut.

6. The motor vehicle as claimed in claim 4, wherein the connecting section of the receiving component is spaced apart in a vertical direction by a predefined height from respective flange-shaped fastening sections at respective free ends of the respective arms.

* * * * *